United States Patent
Bjelosevic et al.

(10) Patent No.: US 10,244,300 B2
(45) Date of Patent: Mar. 26, 2019

(54) INSTRUMENT WITH REMOTE OBJECT DETECTION UNIT

(71) Applicant: Oticon A/S, Smørum (DK)

(72) Inventors: Adis Bjelosevic, Smørum (DK); Ole Fogh Olsen, Smørum (DK); Ariane Laplante-Lévesque, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 15/727,135

(22) Filed: Oct. 6, 2017

(65) Prior Publication Data

US 2018/0035195 A1    Feb. 1, 2018

Related U.S. Application Data

(63) Continuation-in-part of application No. 14/699,060, filed on Apr. 29, 2015, now Pat. No. 9,813,825.

(30) Foreign Application Priority Data

Apr. 30, 2014   (EP) ..................................... 14166645
Oct. 6, 2017    (EP) ..................................... 17195126

(51) Int. Cl.
| | | |
|---|---|---|
| *H04R 1/10* | (2006.01) | |
| *G01S 13/42* | (2006.01) | |
| *G06F 3/01* | (2006.01) | |
| *H04R 25/00* | (2006.01) | |

(52) U.S. Cl.
CPC .......... *H04R 1/1016* (2013.01); *G01S 13/422* (2013.01); *G06F 3/011* (2013.01); *G06F 3/012* (2013.01); *H04R 1/1041* (2013.01); *H04R 25/405* (2013.01); *H04R 25/552* (2013.01); *H04R 25/554* (2013.01); *H04R 1/10* (2013.01); *H04R 1/1033* (2013.01); *H04R 2225/41* (2013.01); *H04R 2225/51* (2013.01)

(58) Field of Classification Search
CPC .... H04R 25/405; H04R 2499/15; H04R 1/10; G01S 13/422
USPC .................................................. 381/312, 313
See application file for complete search history.

(56) References Cited

U.S. PATENT DOCUMENTS

| | | |
|---|---|---|
| 4,586,195 A | 4/1986 | DeGeorge et al. |
| 2003/0154017 A1 | 8/2003 | Ellis |
| 2004/0175008 A1 | 9/2004 | Roeck et al. |
| 2004/0246167 A1 | 12/2004 | Kumon et al. |

(Continued)

FOREIGN PATENT DOCUMENTS

| | | |
|---|---|---|
| EP | 0 713 262 A2 | 5/1996 |
| EP | 1 983 799 A1 | 10/2008 |

(Continued)

OTHER PUBLICATIONS

Extended European Search Report dated Mar. 27, 2018 in EP Patent Application No. 17195126.2.

*Primary Examiner* — Sunita Joshi

(74) *Attorney, Agent, or Firm* — Birch, Stewart, Kolasch & Birch, LLP

(57) ABSTRACT

The present disclosure relates to an apparatus having a directional antenna system having adaptable directionality and a direction determination system configured to determine a desired direction, the directionality of the directional antenna system may be modified or adapted based on the desired direction.

12 Claims, 3 Drawing Sheets

(56) References Cited

U.S. PATENT DOCUMENTS

| | | | | |
|---|---|---|---|---|
| 2007/0282393 A1* | 12/2007 | Marquis | ............... | H04R 25/30 |
| | | | | 607/55 |
| 2012/0008807 A1* | 1/2012 | Gran | ................ | H04R 25/407 |
| | | | | 381/313 |
| 2012/0274502 A1* | 11/2012 | Hyde | ................ | G01S 7/412 |
| | | | | 342/175 |
| 2012/0280824 A1* | 11/2012 | Zelepugas | ............ | H04R 1/1041 |
| | | | | 340/670 |
| 2013/0023954 A1* | 1/2013 | Meskens | ............ | A61N 1/37217 |
| | | | | 607/57 |

FOREIGN PATENT DOCUMENTS

| | | |
|---|---|---|
| EP | 2 941 019 A1 | 11/2015 |
| EP | 3 057 340 A1 | 8/2016 |
| EP | 3 220 663 A1 | 9/2017 |
| WO | WO 2011/040816 A1 | 4/2011 |
| WO | WO 2012/093345 A1 | 7/2012 |

* cited by examiner

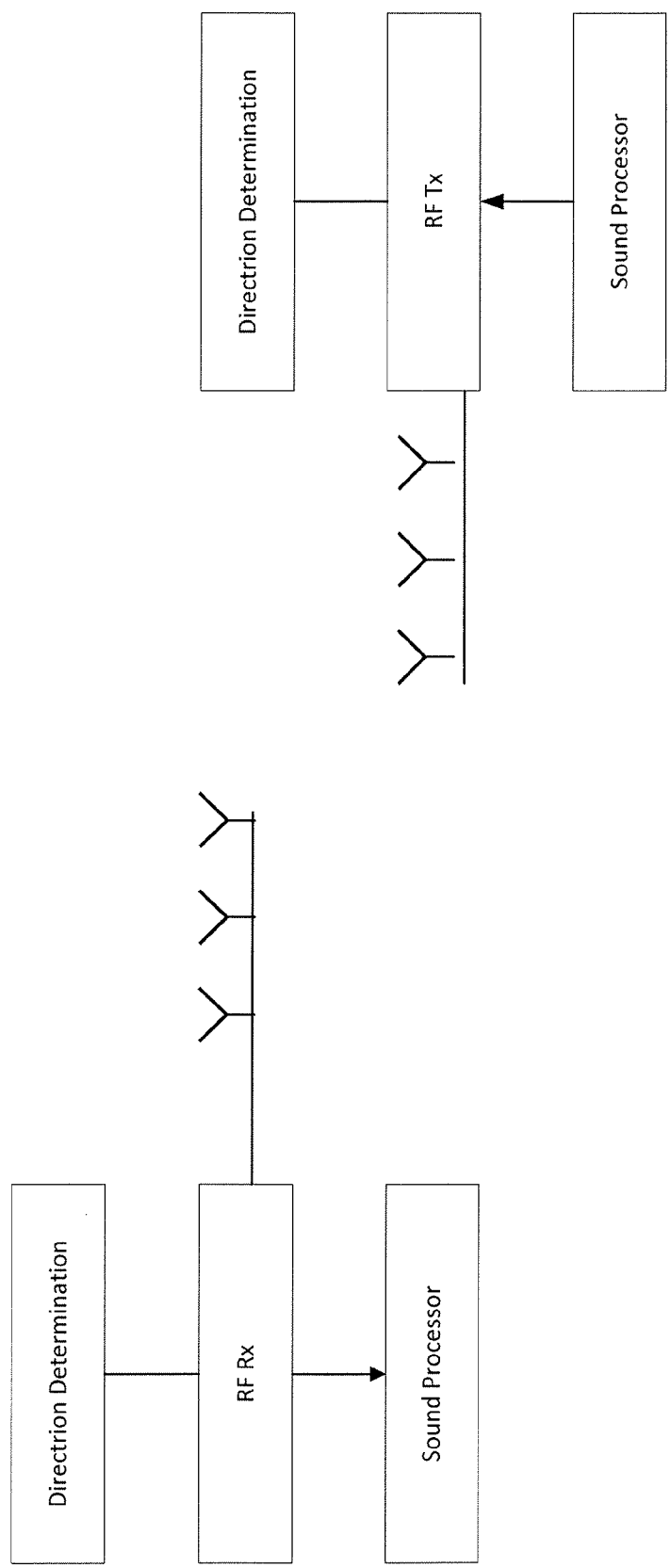

INSTRUMENT WITH REMOTE OBJECT DETECTION UNIT

CROSS-REFERENCE TO RELATED APPLICATIONS

This application is a Continuation-in-Part of co-pending application Ser. No. 14/699,060, filed on Apr. 29, 2015, and claims priority under 35 U.S.C. § 119(a) to European Application Nos. EP 14166645.3, filed on Apr. 30, 2014, and EP 17195126.2, filed on Oct. 6, 2017, all of which are hereby expressly incorporated by reference into the present application.

FIELD OF THE DISCLOSURE

The present disclosure relates to an instrument having a remote object detection unit for detecting remote objects. Moreover, the present disclosure relates to a method for detecting remote objects using an instrument having a remote object detection unit.

BACKGROUND

Sound processing in environments having multiple sound sources is cumbersome and detection and separation of active sound sources is an active field when using instruments having directional microphone systems.

Persons with hearing loss usually have a hard time in crowded areas and areas with heavy traffic, putting themselves in danger of being hit by a vehicle, e.g. a car, a bus, a bicycle or the like. Further, people with hearing loss and reduced eyesight are even more exposed to dangers in traffic.

Hence, an improved apparatus would be advantageous. It is a further object of the present disclosure to provide an alternative to the prior art.

In particular, it may be seen as an object of the present disclosure to provide an apparatus that solves, at least alleviates or provides an alternative the above mentioned problems of the prior art with enhancing sounds from desired sources and/or provides warnings of impinging dangers.

SUMMARY

Thus, the above described object and several other objects are intended to be obtained in a first aspect by providing an apparatus having a housing. The apparatus comprising a directional microphone system having adaptable directionality. The apparatus comprising a processor for adapting the adaptable directionality of the directional microphone system. The apparatus comprising a remote object detection unit configured to detect a remote object by detecting a transmitted signal reflected from the object, the processor being adapted to direct the directionality of the directional microphone system based on the detection of the remote object. The remote object detection unit allows detection of remote objects, which detection may be used to control the directional microphone system and/or warning of the user. The remote object detection unit is adapted to transmit and/or receive independently of the directional microphone system.

A second aspect relates to a method of operating an apparatus having a directional microphone system having adaptable directionality, a processor for adapting the adaptable directionality of the directional microphone system, and a remote object detection unit configured to detect a remote object. The method comprising a step of transmitting from the remote object detection unit an electromagnetic signal. The method comprising a step of receiving at the remote object detection unit a reflected electromagnetic signal. The method comprising a step of determining whether a remote object is present based on the reflected electromagnetic signal and the relative direction to the remote object. The steps of transmitting and receiving may be performed iteratively so as to sweep a number of sections iteratively or according to a schedule or scheme.

A third aspect relates to a system, where a head-worn apparatus and a remotely worn device are in wireless communication. One or both of the apparatuses/devices of the system may comprise an antenna having adaptable directionality for transmission and/or reception of wireless signals. The directionality of the antenna may be adapted based on information on where the recipient and/or transmitting device is placed relative to the other device. The adaptation of the antenna may lower the risk of interfering signals reducing the link quality. The two devices of the system may exchange information on the relative direction to the other device so that the directionality of the antenna may be even faster adapted to establish a good wireless link between the two devices. The direction from one device of the system towards the other may be determined using an remote object detection unit transmitting an electromagnetic signal as outlined elsewhere in the present specification.

Such a system may comprise a head-worn apparatus for enhancing sound perception of a first user and a remotely positioned device configured to be in wireless communication with the head-worn apparatus and to be positioned at a second user. In the system, the head-worn apparatus may have a housing adapted or configred to be worn at the head of the user, and an antenna configured to receive a wireless signal from the remotely positioned device, and an output transducer to provide a signal perceived as sound by the second user. Further, the remotely positioned device may comprise a microphone system configured to receive ambient sound, and a direction determination system configured to determine a desired direction. In the remotely positioned device, an antenna having adaptable directionality may be included, further included may be a processor for adapting the adaptable directionality of the antenna based on the desired direction, and the processor may then be configured to transmit, via the antenna, a signal based on the ambient sound received via the microphone. This is contemplated to allow for maintaining a wireless link between the two devices of the system even when one, or both, devices are moving relatively to each other. The antenna may have a relatively narrow beam, which may then be adapted to be directed towards the other device during use.

An initial direction may be obtain, e.g. via a scan for an optimal link direction using the antenna to e.g. sweep through a number of directions. One of the devices may e.g. be configured to transmit a beacon signal during acquisition or determination of the link direction. The two devices may be configured to exchange information on e.g. link quality, such as signal-to-noise measures, packet loss information, or other quality measures/indicators.

In the above mentioned system, at least one of the devices comprise an adaptive antenna so that the transmit and/or receive direction may be adapted. In a system with such two devices, both devices may include an antenna with adaptable or configurable directionalities. If even further devices or apparatuses are part of the system, e.g. multiple students each having at least one hearing aid, each of the devices or apparatuses may include such an antenna having adaptable directionality.

A person may wear two hearing aids, often referred to as a binaural hearing aid system, where each ear is fitted with a respective hearing aid. The hearing aids need not be of the same type. A person may e.g. have a hearing aid providing air born sound to one ear, and e.g. a bone-conducting hearing aid at the other ear, or even an implanted system.

Initially, a desired direction may be determined from at least the device having an antenna with adaptable directionality. This could be achieved e.g. by performing a sweep with antenna so as to emit a signal, such as a beacon signal, or correspondingly receive such a signal. When the desired direction is determined and a wireless link is established or being established, a sensor may provided information on movement of the person carrying the respective device. This could for instance be an accelerometer indicating that the head of the user is turned, tilted or moved in another way. This additional information could help keeping the directionality of the antenna in an optimal direction.

The antenna having adaptable directionality may have a number of discrete directions that the antenna is able to receive and/or transmit. The antenna having adaptable directionality may have angular limits between which the directionality is definable. The antenna having adaptable directionality may be adaptable both in vertical and/or horizontal directions relative to the wearer.

In general, the embodiments of the disclosure preferably seeks to mitigate, alleviate or eliminate one or more of the above mentioned disadvantages singly or in any combination. The method according to the second aspect may also be used for aiding a blind-source separation algorithm as detecting the presence of an object may help the algorithm to more quickly separate sources.

The method as disclosed may be embodied in a computer program product being adapted to enable a computerized system comprising at least one apparatus having data storage means in connection therewith to control a remote object detection unit in an apparatus according to the first aspect of the disclosure.

The individual features of each aspect may each be combined with any or all features of the other aspects. These and other aspects, features and/or advantages will be apparent from and elucidated with reference to the embodiments described hereinafter.

BRIEF DESCRIPTION OF THE FIGURES

The apparatus/method will now be described in more detail with regard to the accompanying figures. The figures illustrates exemplary implementations and is not to be construed as being limiting to other possible embodiments falling within the scope of the attached claim set.

FIG. 7 is a schematic illustration of two devices each having an adaptable antenna system, FIG. 8 schematically illustrates steps for operating a hearing device having an adaptable antenna.

DETAILED DESCRIPTION OF AN EMBODIMENT

Figure 3:
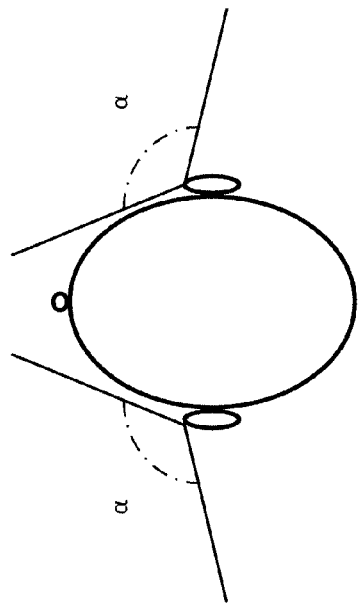

The figures are schematic and simplified for clarity, and they just show details to improve the understanding of the claims, while other details are left out. Throughout, the same reference numerals are used for identical or corresponding parts.

Figure 1:
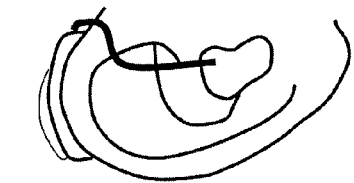
FIG. 1 schematically illustrates a hearing aid positioned at an ear of a person, FIG. 2 schematically illustrates a head of a user where a hearing aid is placed at a right ear where a remote object detection device scans in an angle of a degrees, FIG. 3 schematically illustrates a head of a user where a hearing aid is placed at each ear where each remote object detection device scans in an angle of α degrees, FIG. 4 schematically illustrates a head of a user where a hearing aid is placed at each ear where each remote object detection device scans in an angle of β degrees, FIG. 5 schematically illustrates a head of a user where a hearing aid is placed at each ear where each remote object detection device scans in an angle of γ degrees, FIG. 6 schematically illustrates steps of a method.

FIG. 1 schematically illustrates an apparatus 10 having a housing. The apparatus is positioned at an ear of a person and comprises two parts or housings. One housing is positioned behind the ear, and one housing is positioned at the ear canal or ear canal opening. The two parts or housings are connected by connector. The apparatus illustrated is a hearing aid, but the functionality described herein could also be used in a hand-held microphone, or even in a stationary device, e.g. a conference telephone or device connected to e.g. a TV.

The apparatus 10 comprises a directional microphone system in the housing, which directional microphone system has adaptable directionality. This directional microphone system could for instance be established using two, three or even more, omnidirectional microphones positioned spaced apart by a known distances. By using combinations of the signals from two, three more microphones allows establishment of a directional microphone system. This combination could include delay and/or phase-shift of the signal. The apparatus 10 further comprises a processor for adapting the adaptable directionality of the directional microphone system. This processor performs the needed adaptation of the directionality. The adaptation may include acoustic processing for identifying sound sources. Often hearing aids are equipped with directional microphone system so that sound is picked up from a preferred direction, such as substantially from in front of a person using the hearing aid.

Sound processing algorithms may be used to track the relative movement of a sound source identified via the directional microphone system. In addition to this, or in the alternative, a remote object detection unit may be employed. The remote object detection unit is configured to detect a remote object, such as a person or an inanimate object, by detecting a transmitted signal which has been reflected from the object. This operation is similar to the operation of a maritime 3 or 10 cm radar; however, at e.g. 79 GHz the wavelength is suitable for small form factor, low-power modules, which may be incorporated in housings to be worn at an ear of a person or held in the hand. Such devices may be incorporated in a 28 nm CMOS RFIC design.

Advantageously the processor is then adapted to direct the directionality of the directional microphone system based on the detection of the remote object.

For conserving power, the remote object detection unit detects may be set up to sweep a certain angle interval relative to the housing. In order not to expose the head to excessive electromagnetic power or electromagnetic power over a longer period of time, the remote object detection unit may be configured to sweep an area or angle at certain intervals. The remote object detection unit may be setup for detecting objects according to previously detected object, e.g. if one object has been identified recently, a scheme for sweeping may be adapted accordingly. This scheme could be aimed at detecting new sound sources and/or to maintain the direction of the directional microphone system pointed at the sound source, which may be shifted due to head movements and/or the sound source moving. In environments where multiple people are present, e.g. the classic cocktail party scenario, the remote object detection unit may be used to keep track of possible sound sources, and the directional microphone system and the accompanying audio processing algorithms, may then be used to point out the desired sound target from the identified possible sound sources. This may alleviate the sound processing as less time and processing is used to identify active sound targets.

Generally, the remote object detection unit may be configured to transmit, and receive, an electromagnetic signal having a carrier frequency within the 1 to 100 GHz frequency range.

When this remote object detection unit is included in a housing carried by a person, it is possible to determine the speed of a detected remote object, or at least the relative speed of the detected remote object. This could be done using the Doppler effect, which also provides information on the relative movement of the remote object, i.e. closing in or moving away. The determined speed, possibly along with the direction, could be used to determine if imminent danger of collision. This could be advantageous when the user is moving around in a busy environment, such as a city centre with cars, busses, trucks, bicycles and people. A speaker unit could then provide an acoustic signal upon detection of a remote object having a speed above a given threshold, as this could indicate e.g. an approaching vehicle. The remote object detection unit could also be used as a proximity warning system indicating that an object is within a given distance from the user. Combinations of the properties of the remote objects may also be used, e.g. an approaching vehicle having a speed above some threshold within a given distance will cause the speaker to emit a sound. Further, a small vibrational unit may be included in the housing to provide a vibrational sensation at the ear. For binaural systems, that is system with a hearing aid at each ear, it is also possible to provide directionality the warning, so that if something is approaching from the left, a warning is given at the left ear, etc.

Depending on the resolution level of the remote object detection unit, it is possible to characterise the remote object as one of: a person, a car, a bicycle, a fixed metallic object.

Overall, the apparatus is described as a hearing aid but could also be a hand-held microphone, a wearable device or a stationary device. An example of a stationary device could be a so-called TV-box.

Figure 2:
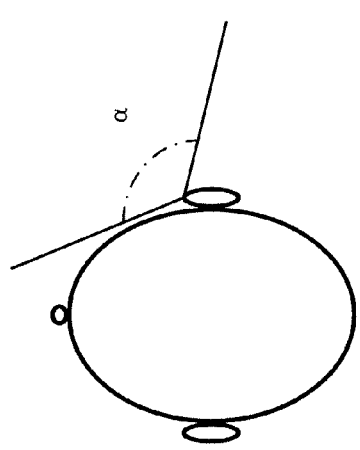
Figure 4:
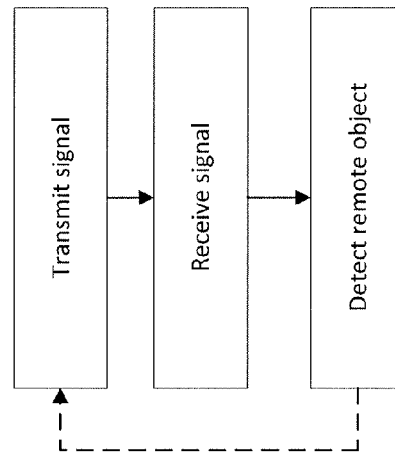
Figure 8:
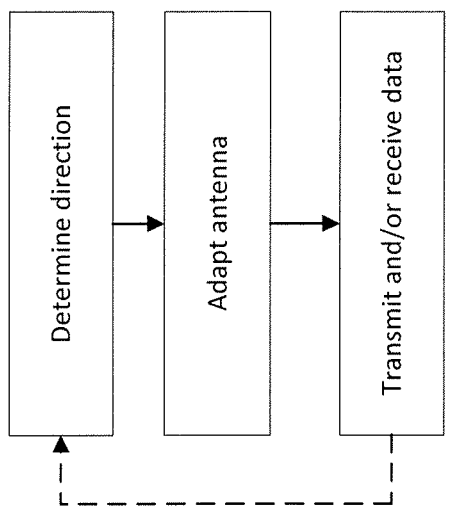

FIG. 2 schematically illustrates a head of a user where a hearing aid is placed at a right ear where a remote object detection device scans in an angle of a degrees. The angle a may be determined by the characteristics of the antenna used. As illustrated in FIG. 4 the angle may be larger than shown in FIG. 1.

FIG. 3 schematically illustrates a head of a user where a hearing aid is placed at each ear where each remote object detection device scans in an angle of α degrees. By having two hearing aids each scanning an area the combined area scanned is larger, and thereby the security established for the user. Further, the larger area allows tracking and/or detection of people speaking in front of the user.

FIG. 4 schematically illustrates a head of a user where a hearing aid is placed at each ear where each remote object detection device scans in an angle of β degrees. Generally the angular restriction could extend backwards of the head so as to allow the directional microphone system to adapt and pick up sounds emanating from behind the user, e.g. a caretaker pushing a wheel chair.

Figure 5:
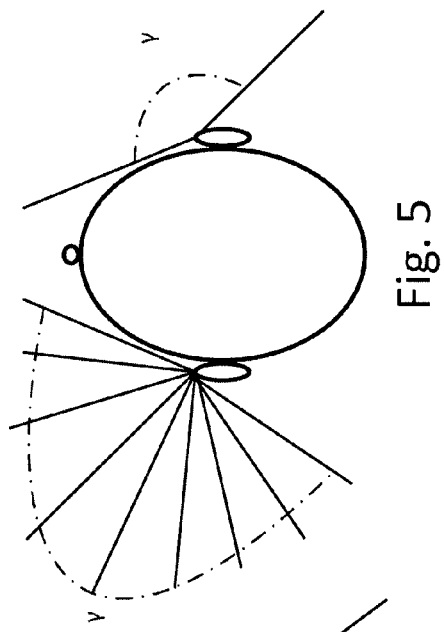

FIG. 5 schematically illustrates a head of a user where a hearing aid is placed at each ear where each remote object detection device scans in an angle of γ degrees. Each angular section is divided into a number of subsections. The subsections are illustrated as being separated, but in practice there will be some overlap due to the directionality characteristics of the antenna used for the remote object detection unit. As mentioned, the subsections may be scanned consecutively, randomly or according to a fixed scheme. Whichever method is used, the method may be adapted according to which environment the user is in.

Figure 6:
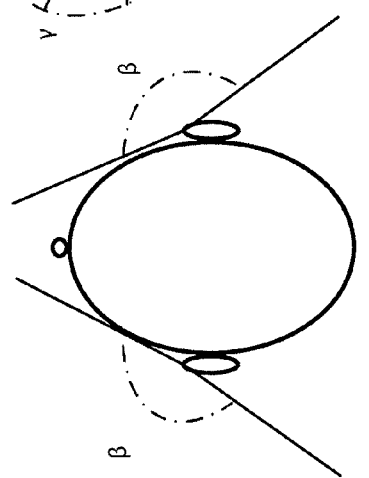

FIG. 6 schematically illustrates steps of a method of operating an apparatus having a directional microphone system having adaptable directionality, a processor for adapting the adaptable directionality of the directional microphone system, and a remote object detection unit configured to detect a remote object. Such an apparatus could be an apparatus as discussed in relation to FIGS. 1-5. The method comprises a step of transmitting from the remote object detection unit an electromagnetic signal. The method comprises a step of receiving at the remote object detection unit a reflected electromagnetic signal. The remote object detection unit thus emits a signal in a given direction and awaits an echo. This allows detecting an angular direction to the remote object, if present. Further processing and analysis of the echo may provide information on the speed of the remote object, e.g. based on the Doppler Effect.

The directional microphone system may then provide information on whether any detected remote object is an active sound source or not. If active, the directionality of the directional microphone system may be adapted based on the detection of a remote object directional microphone system. Advantageously, the adaptation of the directionality of the directional microphone system may be conditioned on the remote object being classified as a sound source. In the cocktail scenario, one source may be identified as a preferred source and the directional microphone system may be adapted accordingly, even if more active sound sources are identified. A combination of the remote object detection unit and the directional microphone system may be used for identifying remote active sound sources.

A classification of the remote object may include determining if the remote object is a human or a machine. This could be used for automatically determining if a warning signal should be issued for warning the user of an approaching vehicle.

The remote object detection unit can be used to detect active and silent remote objects and the directionality of the directional microphone system could be used for scanning the remote objects detected by the remote object detection unit to classify them as active or silent.

A further use of the knowledge of the direction to a source is to adapt a directional antenna, such as an array antenna comprising two or more smaller antennae elements. The array antenna could comprise two, three, four, five, or more elements.

This is advantageous in areas where may wireless signals are present, but also, or alternatively, when two devices needs to communicate wirelessly, such as a hearing aid, or binaural hearing aid system, and an external device having an antenna and a microphone.

Also, in some cases many wireless signal will be present in the same area from different kinds of wireless transmitters and receivers. Interference may cause the wireless link to be lost or degraded.

For users of hearing aids with wireless link, the loss of wireless link from e.g. a remote microphone will result in a loss of audio packets between the transmitting device and the receiving device, and therefore loss of audibility. For example, for a student wearing a hearing aid linked to a remote microphone of the teacher may have the adverse effect of the student not understanding what the teacher said.

For a portable device, such as a teacher microphone, the antenna could be positioned at, such as under, a surface intended to face away from the teachers body. This part of a portable device, such as a teacher microphone, could provide a surface having a relatively large area for positioning multiple antenna elements.

In a hearing aid, e.g. to be positioned in the area behind the users ear, an antenna could be formed at or under a side wall of the hearing aid housing that is configured to be positioned behind the ear of the user, whereas a second part is configured to be positioned in the ear canal, e.g. having a receiver and/or ear mold. Such as configuration is, as described above, often referred to as either a receiver-in-the-ear or behind-the-ear.

When a, relative, direction from one device towards the other, remotely placed, device is determined, the antenna may be adapted so that the signal transmitted from the antenna is directed towards the other device. Thereby the energy needed to ensure optimal transmission under the given circumstances are provided. This is most relevant for relatively high frequencies, such as around 1-10 GHz, such as around the frequencies used for Bluetooth, WiFi and the like protocols, such as at 2.4 GHz, such as at 5 GHz.

The determination of the direction may also be used for controlling the adaptable directionality of the microphone. Further, the above-mentioned electromagnetic signal transmission system may be used as at least part of the direction determination.

The antenna with adaptable directionality could be embodied as an antenna array, or multiple antenna arrays, with smaller radiating elements combined with signal processing and beamforming. The antenna array could e.g. be a line of 2, 3, 4 or more smaller antennae with switchable elements. Alternatively, the antenna array could be e.g. a square with 2×2, 3×3, 4×4 or other combinations of smaller antennae with switchable elements. Further, the antenna array could be e.g. arranged as a rectangle with 2×3, 2×4, 3×4, 3×5, 4×5 or other combinations and/or permutations of smaller antennae with switchable elements.

A phased array architecture could employ beam steering and forming using RF-phase and/or amplitude shifters, or beam forming networks.

The adaptation of the antenna may be performed continuously, periodically or event based. Further, adaptation may, in some cases, be performed just prior, and/or during, transmission of data.

FIG. 7 schematically illustrates two devices each having an adaptable antenna system. One of the device is to be worn by e.g. a teacher and the other by a student. In other scenarios, one device, e.g. being a hearing aid, is worm by a hearing impaired user, and the other device, e.g. a microphone device, is worn by, or at least positioned near, a person talking that the hearing impaired user wish to hear more clearly, e.g. .a spouse, or someone giving a lecture, or the microphone device could simply be placed on a table during a social event for improved microphone reception.

The microphone device is to be positioned remote from e.g. the hearing aid user, which could be a, young, student in a classroom setting. As the teacher moves around, the wireless link may be disturbed, especially when the antenna is a highly directional antenna. By employing an antenna having an adaptable directionality, a link having a high link quality, e.g. expressed by a low packet loss or the like, may be established and maintained even when the source, or the device having the antenna, is moving or shifting.

In FIG. 7 this is illustrated by three antennae elements together forming an antenna array. Both devices are illustrated having the same array, however, the two, or more, devices need not implement the same type or structure.

The head-worn apparatus may include that the device is configured to transmit the detected direction towards the remote device via the wireless to the remote device, and wherein the remote device is configured to adapt the direction of the adaptable antenna based at least in part on the relative direction from the head-worn device.

It may be advantageous that at least one device in a system is able to include information from the other device when determining how to adapt the directionality of the adaptable antenna. This could increase the efficiency of the system and possibly lower the time needed to establish the desired direction.

One or more devices of the system may include a positioning device configured to provide a signal representing the position of that device as e.g. a coordinate set in a global coordinate system. Having more devices of the system including such a positioning system could allow for an adaptation of the antenna based on at least two coordinate sets. Other direction indicators may be included, e.g from a radar system in one or more of the devices as disclosed herein.

One or more of the devices of the system may be configured to transmit a beacon signal that another device of the system may register. This beacon signal may e.g. be used to determine the direction to the device emitting the beacon signal. The determination of the direction may e.g. be based at least in part on determining signal strength of the beacon signal. This could be achieved using an antenna having adaptable directionality.

Thus, a hearing aid may be provided where the microphone system may be adapted based on a determined direction to a source. Further, an antenna having adaptable directionality may be adapted based on the determined direction to a wireless source. Still further, both a microphone system and an antenna may be adapted based on a determined direction to a source emitting both sound and a wireless signal.

In a system, e.g. located in a school, a teacher may carry a device with a microphone and a wireless system for broadcasting a signal based on the microphone. One or more students may then have each their hearing aid or aids which each include an adaptable antenna, each of which are configured to determine a direction to the teacher to establish and maintain a wireless connection to be able to receive wirelessly the signal based on the microphone.

The system may include a stationary unit routing the wireless signal from the teacher, which stationary unit then broadcast a signal to the students respective hearing aids.

When obtaining, or searching for, a direction, the antenna system may be configured to search a fixed number of directions. This could e.g. be two directions where a signal strength indication is obtained from both directions and the direction having the stronger indication is then chosen. Further numbers of spots or directions may be used. In a situation where e.g. three directions are relied upon, the three directions may form a triangular geometry, seen in a direction directly towards the antenna. This could allow for optimising the directionality in situations where the transmitting antenna is located at an elevated position relative to the receiving antenna, such as a teacher standing in a classroom while the student or students are sitting down.

Having multiple angles and directions that the antenna is able to transmit and/or receive in allows for greater flexibility.

In addition to the, relatively, high frequency antenna with adaptable directionality, other types of wireless communication may be available in the hearing aid, such as inductive communication, e.g. a telecoil and/or other inductive systems, e.g. for through-the-head communication.

In the use case where a signal must reach several hearing devices, e.g. a teacher microphone system transmitting to several students, the directionality pattern should favour the angle of incidence of the several hearing devices. Directionality could also favour the hearing devices that would otherwise have the lowest wireless communication signal-to-noise ratio.

Some aspects of the present disclosure relates to the following items.

1. A head-worn apparatus for enhancing sound perception of a user, the apparatus having a housing adapted to be worn at the head of the user, the head-worn apparatus comprising: a directional microphone system having adaptable directionality, where the directional microphone system comprises a plurality of omnidirectional microphones, a remote object detection unit configured to emit an electromagnetic signal and to detect a remote object by detecting an electromagnetic signal reflected off the object, a processor for adapting the adaptable directionality of the directional microphone system based on the detection of the remote object, wherein the processor is adapted to enhance sound from the object according to the users specific hearing loss.
2. The head-worn apparatus according to item 1, wherein the remote object detection unit is configured to transmit an electromagnetic signal having a carrier frequency within the 1 to 100 GHz frequency range.
3. The head-worn apparatus according to item 1, wherein the remote object detection unit is configured to determine the speed of the remote object, such as the relative speed of the remote object.
4. The head-worn apparatus according to item 3, further comprising a speaker unit, which provides an acoustic signal upon detection of a remote object having a speed above a threshold.
5. The head-worn apparatus according to any one of items 1, wherein the remote object detection unit characterises the remote object as one of: a person, a car, a bicycle, a fixed metallic object.
6. The head-worn apparatus according to any one of items 1, wherein the apparatus is a hearing aid or a hand-held microphone.
7. A hearing aid comprising an input device for receiving a sound signal, a processor for processing the sound signal to compensate for a user's hearing loss, an output transducer for providing the processed signal to the user in a form perceivable as sound, a remote object detection unit for detecting objects remote from the hearing aid by detecting reflections of an electromagnetic signal transmitted from the remote detection unit and reflected by the remote object.
8. A method of operating a head-worn apparatus having a directional microphone system having adaptable directionality, a processor for adapting the adaptable directionality of the directional microphone system, and a remote object detection unit configured to detect a remote object, the method comprising: transmitting from the remote object detection unit an electromagnetic signal, receiving at the remote object detection unit a reflected electromagnetic signal, determining whether a remote object is present based on the reflected electromagnetic signal and the relative direction to the remote object, and adapting the directionality of the directional microphone system based on the detection of a remote object.
9. The method according to item 8, wherein the apparatus includes a classifying unit for classifying objects as sound or not-sound sources, the adaptation of the directionality of the directional microphone system is conditioned on the remote object being classified as a sound source.
10. The method according to item 9, wherein the classification of the remote object includes determining if the remote object is a human or a machine.
11. The method according to any one of item 7-10, wherein the directional microphone system is used for identifying remote active sound sources.
12. The method according to item 11, wherein the remote object detection unit detects active and silent remote objects and the directionality of the directional microphone system scans the remote objects detected by the remote object detection unit to classify them as active or silent.
13. The method according to any one of item 7-12, further comprising: determining speed of remote object, and provided the speed is above a threshold, the method comprises issuing a warning signal.

As described above, the method may include determining speed of remote object, and provided the speed is above a threshold, the method comprises issuing a warning signal.

Combinations of the above embodiments and many other embodiments will be apparent to those of skill in the art upon reading and understanding the above description.

The apparatus and/or method steps as set out in the claims may be implemented by means of hardware, software, firmware or any combination of these. Some of the features could also be implemented as software running on one or more data processors and/or digital signal processors.

The individual elements of any of the disclosed embodiments may be physically, functionally and logically implemented in any suitable way such as in a single unit, in a plurality of units or as part of separate functional units. It is intended that the structural features of the devices described above, in the detailed description and in the claims may be combined with steps of the method, when appropriately substituted by a corresponding process. Embodiments of the method have the same advantages as the corresponding systems.

Although the present disclosure discusses specific embodiments, the claims should not be construed as being in any way limited to the presented examples. Although specific embodiments have been illustrated and described herein, it will be appreciated by those of ordinary skill in the art, that any arrangement which is calculated to achieve the same purpose may be substituted for the specific embodiments shown. The scope of protection is defined by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the claims. Furthermore, individual features mentioned in different claims, may possibly be advantageously combined, and the mentioning of these features in different claims does not exclude that a combination of features is not possible and advantageous.

The invention claimed is:

1. A system comprising a head-worn apparatus for enhancing sound perception of a first user and a remotely positioned device configured to be in wireless communication with the head-worn apparatus and to be positioned at a second user,
   the head-worn apparatus having a housing adapted to be worn at the head of the user, and an antenna configured to receive a wireless signal from the remotely positioned device, and an output transducer to provide a signal perceived as sound by the second user,
   the remotely positioned device comprising:
      a microphone system configured to receive ambient sound,
      a direction determination system configured to determine a desired direction,
      an antenna having adaptable directionality,
      a processor for adapting the adaptable directionality of the antenna based on the desired direction, and the processor configured to transmit, via the antenna, a signal based on the ambient sound received via the microphone.

2. The system according to claim 1, wherein the head-worn device includes a direction determination system configured to determine a desired direction, and further in the head-worn device:
   the antenna having adaptable directionality, and
   the processor is configured to adapt the adaptable directionality of the antenna based on the desired direction.

3. The system according to claim 1, wherein the direction determination system comprises a remote object detection unit configured to emit an electromagnetic signal and to detect a remote object by detecting an electromagnetic signal reflected off the object, the desired direction being based on the direction to the detected remote object, and optionally, the direction determination system includes a sensor to detect movement or change of orientation of the head-worn apparatus and/or the remotely positioned device, the sensor optionally being one or more of: a gyroscope, a tilt sensor and/or an accelerometer.

4. The system according to claim 1, wherein the head-worn and/or the remotely positioned device includes a positioning device configured to provide a signal representing the position of that device as e.g. a coordinate set in a global coordinate system.

5. The system of claim 1, wherein the head-worn apparatus is configured to transmit the desired direction towards the remote device via the wireless to the remote device, and wherein the remote device is configured to adapt the direction of the adaptable directionality of the antenna based at least in part on the relative direction from the head-worn device.

6. A system comprising a head-worn apparatus for enhancing sound perception of a first user and a remotely positioned device configured to be in wireless communication with the head-worn apparatus and to be positioned at a second user,
   the head-worn apparatus having a housing adapted to be worn at the head of the user, and an antenna configured to receive a wireless signal from the remotely positioned device, and an output transducer to provide a signal perceived as sound by the second user,
   a direction determination system configured to determine a desired direction,
   an antenna having adaptable directionality,
   a processor configured to adapt the adaptable directionality of the antenna based on the desired direction, and
   the remotely positioned device comprising:
      a microphone system configured to receive ambient sound,
      an antenna configured to emit and/or receive an electromagnetic signal, and
      a processor configured to transmit, via the antenna, a signal based on the ambient sound received via the microphone.

7. The system of claim 6, wherein the remotely positioned device includes a direction determination system configured to determine a desired direction,
   the antenna having adaptable directionality, and
   the processor is configured to adapt the adaptable directionality of the antenna based on the desired direction.

8. The system according to claim 6, wherein the direction determination system comprises a remote object detection unit configured to emit an electromagnetic signal and to detect a remote object by detecting an electromagnetic signal reflected off the object, the desired direction being based on the direction to the detected remote object, and optionally, the direction determination system includes a sensor to detect movement or change of orientation of the head-worn apparatus and/or the remotely positioned device, the sensor optionally being one or more of: a gyroscope, a tilt sensor and/or an accelerometer.

9. The system of claim 6, wherein the head-worn apparatus is configured to transmit the desired direction towards the remote device via the wireless to the remote device, and wherein the remote device is configured to adapt the direction of the adaptable directionality of the antenna based at least in part on the relative direction from the head-worn device.

10. The system according to claim 6, wherein the head-worn and/or the remotely positioned device includes a positioning device configured to provide a signal representing the position of that device as e.g. a coordinate set in a global coordinate system.

11. The system according to claim 6, wherein the head-worn and/or the remotely positioned device is/are configured to transmit a beacon signal.

12. The system according to claim 8, wherein the remote object detection unit is configured to transmit an electromagnetic signal having a carrier frequency within the 1 to 100GHz frequency range.

* * * * *